United States Patent
Rader, III

[11] Patent Number: 5,485,905
[45] Date of Patent: Jan. 23, 1996

[54] LIGHTWEIGHT OVERRUNNING CLUTCH ASSEMBLY

[76] Inventor: H. John Rader, III, 4428 Amherst, Dallas, Tex. 75225

[21] Appl. No.: 222,258

[22] Filed: Apr. 1, 1994

[51] Int. Cl.$^6$ .............................. F16D 23/00; F16D 41/06
[52] U.S. Cl. .............................. 192/64; 192/41 A; 192/45; 384/584; 464/170; 464/903
[58] Field of Search .................... 192/64, 45, 41 A; 384/441, 584; 464/170, 185, 903

[56] References Cited

U.S. PATENT DOCUMENTS

| | | |
|---|---|---|
| 2,049,880 | 8/1936 | Winkler . |
| 3,865,220 | 2/1975 | Thompson, Jr. . |
| 3,937,312 | 2/1976 | Gehrke . |
| 4,046,238 | 9/1977 | Mendoza-Orozco . |
| 4,461,375 | 7/1984 | Brown ........................................ 192/45 |
| 4,603,555 | 8/1986 | Mayer ................................... 192/112 X |
| 4,650,049 | 3/1987 | Stephens . |
| 4,660,698 | 4/1987 | Miura ........................................ 192/45 |
| 4,901,832 | 2/1990 | Werner ................................... 192/45 X |
| 4,915,201 | 4/1990 | Stark et al. . |
| 4,916,974 | 4/1990 | Kozakae et al. .................... 192/64 X |
| 5,099,972 | 3/1992 | Ouchi ........................................ 192/45 |
| 5,125,489 | 6/1992 | Cha . |
| 5,129,711 | 7/1992 | Chen . |
| 5,183,139 | 2/1993 | Malecha . |
| 5,188,205 | 2/1993 | Karp et al. . |
| 5,390,773 | 2/1995 | Proia ................................... 192/64 X |

FOREIGN PATENT DOCUMENTS 1695011  11/1991  U.S.S.R. ................................. 192/64

Primary Examiner—Andrea L. Pitts
Attorney, Agent, or Firm—Haynes and Boone

[57] ABSTRACT

An overrunning clutch assembly comprises a housing and a tubular shaft rotatably coupled together with a roller or sprag clutch positioned therebetween to permit the housing to freely rotate about the shaft in one direction, or to establish torque communication between the shaft and the housing when rotated in the opposite direction. To minimize the weight of the assembly while also containing the radial forces and stresses generated by the roller clutch when transmitting torque, the housing and the shaft are reinforced with high-strength, high-modulus materials having high strength-to-weight ratios.

15 Claims, 2 Drawing Sheets

LIGHTWEIGHT OVERRUNNING CLUTCH ASSEMBLY

TECHNICAL FIELD

This invention relates generally to an overrunning clutch, and more particularly to an overrunning clutch assembly that utilizes clutch rollers or sprags and, to minimize weight, utilizes reinforcing materials having high strength-to-weight ratios.

BACKGROUND OF THE INVENTION

One-way or overrunning clutches transmit torque in one direction only and are generally used to disengage a drive connection automatically when torque is applied in the reverse direction. Overrunning clutches commonly comprise two members having cylindrical, concentric, opposed faces defining an annular space therebetween. The inner face is keyed or otherwise fixed to an input shaft, and the outer face is fixed to a housing, or hub or sleeve, from which the drive is ultimately taken. Alternatively, the outer face may form the torque input member and the inner face may form the torque output member.

Generally, overrunning clutches use a ratchet mechanism, sprag elements, or roller elements to effect the transmission of torque in only one direction.

In a ratchet-type of overrunning clutch, a series of ratchet teeth is, for example, attached to the input shaft and a pawl is attached to the output housing. The pawl is spring-loaded and the teeth are oriented so that when the input shaft is rotated in one direction, the pawl engages with the teeth to transmit torque from the input shaft to the output housing. When the direction of rotation is reversed, the pawl is released form the teeth and no torque is transmitted.

In a sprag-type of overrunning clutch, a series of rocking tumblers or sprags is held together within a cage. The cage typically includes two rings and a crimped ribbon spring in the annular space between the rings. All three components of the cage are pierced to accommodate the sprags. The ribbon spring biases the sprags upright between the inner and outer races of the drive coupling. Because the radial clearance between the races is insufficient for the sprags to rock all the way to their top dead center positions, the sprags jam between the races. As long as the drive is in the direction tending to keep the sprags thus jammed, torque is transmitted from the input shaft, through the inner race, and finally to the outer race. Whenever the drive is reversed, the sprags tend to lay down against the influence of the ribbon spring, and no torque is transmitted.

Similarly, a roller-type of overrunning clutch uses rollers housed in inclined recesses formed in the annular space between the inner and outer races. When the shaft is rotated in one direction, the rollers run up the inclines and jam between the inner and outer races. If the shaft is thereafter rotated in the other direction, the rollers run down the inclines and are freed in the space between the two races, which is wider than the diameter of the rollers. To obviate backlash in the system, the rollers may be spring-loaded up to the inclines.

Each of the described overrunning clutch types have disadvantages when employed in certain high performance applications such as in the clutch assemblies of racing or mountain bicycles. For example, when a ratchet clutch is rotated in a forward direction, the pawl runs along the teeth resulting in a "clicking" noise. Furthermore, when the direction of rotation is reversed, a ratchet clutch generally requires 9 to 12 degrees of rotation before the housing and shaft become sufficiently engaged via the ratchet and pawl to transmit torque. Unlike the ratchet overrunning clutches, sprag and roller clutches are quiet and engage instantly to transmit torque. However, sprag and roller clutches are used less frequently than ratchet clutches because the former generate large radial forces. These forces have an expanding effect on the outer housing used to contain the rollers or sprags and a contracting effect on the input shaft. To contain these stresses, housings and shafts for these clutches must be made much larger and heavier than housings and shafts for ratchet clutches. This is a great disadvantage in the bicycle market, for example, where bicycles are valued in large part by their lightweight, compact construction.

For the foregoing reasons, there is a need for an overrunning clutch that is both quiet and quick to engage, yet which is also of lightweight and compact construction.

SUMMARY OF THE INVENTION

The foregoing problems are solved and a technical advance is achieved by a clutch assembly that utilizes and has the advantages of sprag and roller clutches but that is also lightweight. In a departure from the art, special high-strength lightweight materials circumscribe the clutch housing, or a sleeve therein, and strengthen the shaft where large forces and stresses are generated.

In a preferred embodiment of the invention, the clutch assembly comprises a tubular shaft and a housing rotatably sleeved about the shaft. The shaft and housing define an annular space therebetween having a sleeve and a shell disposed therein, the shell being interior to the sleeve. The shell has inclined recesses containing clutch rollers for the transmission of torque in only one direction of rotation. The housing, or in an alternative embodiment, the sleeve, has an outer surface circumscribed by reinforcing material having high tensile strength and a high modulus of elasticity. Similarly, the tubular shaft is reinforced on an inner surface with material having high compressive strength and a high modulus of elasticity.

An advantage achieved with the invention is the provision of a clutch assembly that is relatively compact and that weighs less than conventional clutch assemblies utilizing a ratchet mechanism, roller elements, or sprag elements.

A further advantage achieved over ratchet clutches is that the invention operates silently and engages instantly when torque is applied in a reverse direction.

A further advantage results from the added strength that accrues from the special materials used. The tubular shaft can be designed to receive a relatively large, strong, stiff axle. Greater cantilever loads than are possible with conventional designs may thereby be absorbed from components, such as gear assemblies and a bicycle frame, attached to the axle. This would be particularly advantageous for bicycles designed to be ridden over race circuits or rough terrain.

DETAILED DESCRIPTION OF THE PREFERRED EMBODIMENTS

Figure 1:
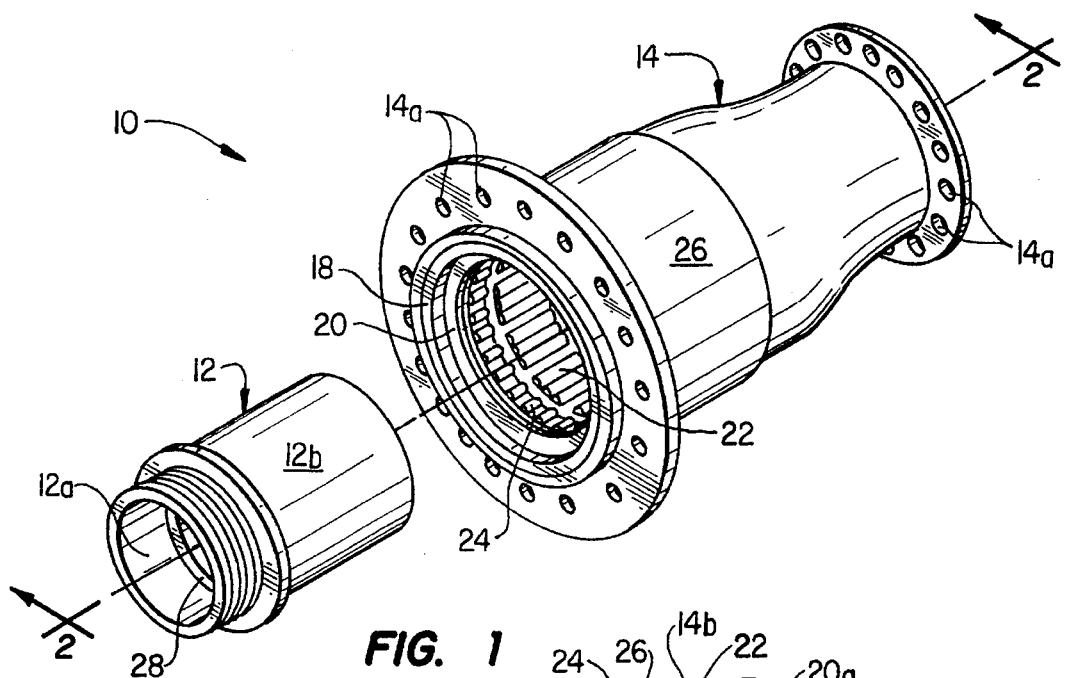
FIG. 1 is a partially exploded view of the hub and shaft assembly of a first preferred embodiment of the present invention.

In FIG. 1, the reference numeral 10 designates a first preferred embodiment of an overrunning clutch assembly. Application of the assembly 10 is herein described with reference to a bicycle free-wheel (not shown), it being understood that other applications are also contemplated. The assembly 10 includes a tubular steel shaft 12 and an aluminum housing 14 rotatably sleeved about the shaft. Holes 14a are defined in the housing 14 for attaching spokes (not shown) to support a wheel and tire assembly (also not shown). The assembly 10 may also include components for interconnection with other parts of a bicycle, such as a bicycle frame and gear assemblies (not shown); such components are not further described here because they are commonly known in the art.

Figure 2:
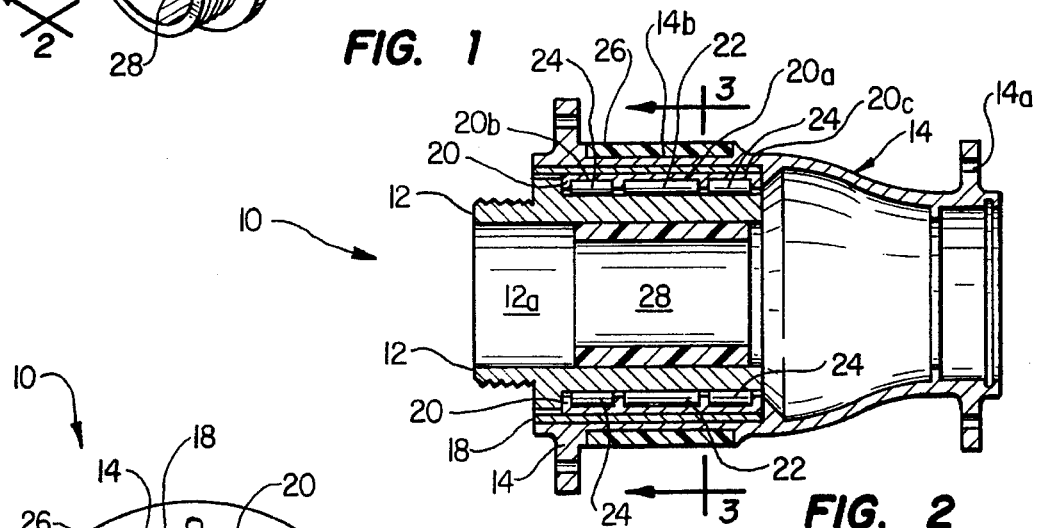
FIG. 2 is a cross-sectional view of the assembly taken along line 2—2 of FIG. 1.
Figure 3:
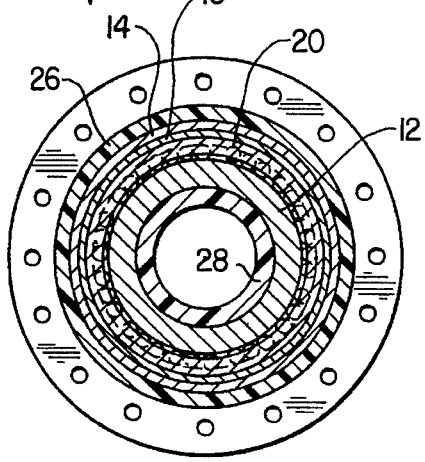
FIG. 3 is a cross-sectional view of the assembly taken along line 3—3 of FIG. 2.

As shown in FIGS. 2 and 3, the housing 14 defines a large outer annular race 14b for receiving a band of material 26. The race 14b extends longitudinally about 1 inch and has a depth of about 3 millimeters. Proximate to the race 14b, the housing 14 has a wall thickness of approximately 3 millimeters, and distal from the race 14b, it has a wall thickness of approximately 1.25 millimeters.

The band of material 26 is a carbon fiber composite material having (relative to steel) a high tensile strength and a high modulus of elasticity. The material 26 comprises a pre-preg resin system, the resin not being activated until it is heated to a specified temperature. The material 26 is tension-wrapped around the race 14b so that all voids are removed from between the fibers resulting in fibers that are closely aligned and closely lying on top of each other. The material 26 is wrapped in this manner until it fills and is flush with the top of the race 14b.

After the fiber resin material 26 is wrapped around the race 14b, the material and the housing 14 are heated to a temperature, for example, between 250° F. and 350° F., such temperature being maintained for approximately 1½ hours for curing the material and affixing the material about the race. The housing 14 and material 26 are then cooled to an ambient temperature such as 70° F., during which process, the outside diameter of the housing contracts approximately 0.003 inches more than the inside diameter of the material. Once the fiber resin material 26 is cured, a thin hardened-steel sleeve 18 is press-fitted inside the housing 14. The sleeve 18 is sized so that, when it is press-fitted into the housing 14, there is approximately 0.004 inches of interference therebetween so that the housing is urged against the material 26 and so that both the housing and the material are preloaded in tension.

A pre-fabricated tubular section of carbon fiber composite resin material 28, having (relative to steel) a high compressive strength and a high modulus of elasticity, is press-fitted into the shaft 12 so as to be urged against an inner surface 12a and to preload the shaft in tension. The material 28 has a radial thickness of approximately 3 millimeters and extends longitudinally approximately 1 inch. The diameter of the material 28 is sized so that, when it is press-fitted into the shaft 12, there is approximately 0.001 inches of interference to preload the shaft in tension.

A roller clutch shell 20 defines three longitudinally aligned annular races 20a, 20b, and 20c. Race 20a is approximately centered under race 14b and further defines a series of inclined recesses (not shown) for receiving a series of clutch rollers 22, each of the clutch rollers being approximately ½ inch in length. Each of the recesses have a first end and a second end, the ends being oriented similarly on each recess. The first end of each of the inclined recesses is smaller than the diameter of the rollers, and the second end of each of the recesses is larger than the diameter of the rollers. The two races 20b, 20c are spaced apart longitudinally from race 20a for receiving two sets of ball bearings 24. The shell 20 is press-fitted inside the sleeve 18. The clutch rollers 22 are snap-fitted into the race 20a, and the roller bearings 24 are snap-fitted into the other two races 20b, 20c. The shaft 12 is positioned inside the shell 20 so that the outside surface 12b of the shaft is urged against the bearings 24 and the material 28 is centered under the clutch rollers 22. This assembly is wellknown in the art, and therefore will not be further described herein.

Figure 4:
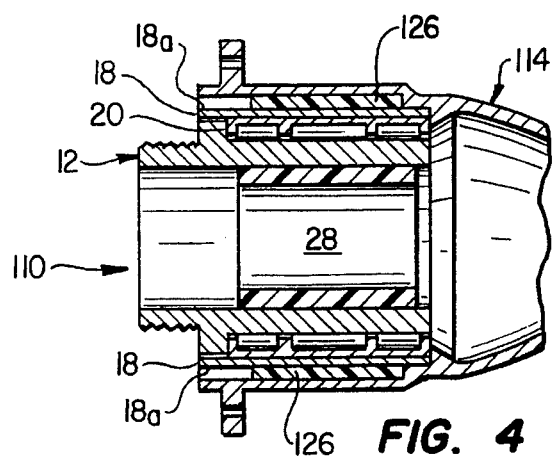
FIG. 4 is a partial cross-sectional view of the hub and shaft assembly of an alternative embodiment of the present invention.

FIG. 4 depicts the details of a hub and shaft assembly 110 according to an alternative embodiment of the present invention. Since the assembly 110 contains many components that are identical to those of the previous embodiment, these components are referred to by the same reference numerals and will not be described in any further detail.

According to the embodiment of FIG. 4, the assembly 110 includes a tubular steel shaft 12, an aluminum housing 114 rotatably sleeved about the shaft, and an annular space defined therebetween for receiving the steel sleeve 18 and the shell 20.

A pre-fabricated tubular section of carbon fiber composite resin material 126, having (relative to steel) a high compressive strength and a high modulus of elasticity, is press-fitted onto the sleeve 18 so as to circumscribe an outer surface 18a of the sleeve and to preload the sleeve in compression. The material 126 has a radial thickness of approximately 3 millimeters and extends longitudinally approximately 1 inch. The diameter of the material 126 is sized so that, when it is press-fitted onto the sleeve 18, there is approximately 0.001 inches of interference to preload the sleeve in compression.

The sleeve 18, circumscribed by the material 126, is press-fitted into the housing 114, the housing being sized so that an approximately 0.002 inch interference fit results therein, thus preloading the housing in tension and further preloading the sleeve in compression.

The remainder of the assembly 110 is identical with the assembly 10, and thus will not be described in further detail.

In operation, when the shaft 12 is rotated in one direction, the clutch rollers 22 run up the inclined recesses defined by the race 20a toward the first ends and jam between the race 20a and the surface 12b. As long as the drive is in the direction tending to keep the rollers 22 thus jammed, radial force is exerted on the shaft 12 and housing 14, 114, and torque is transmitted from the shaft 12 to the housing 14, 114. The radial force has an expansive affect on the sleeve 18 and the housing 14, 114 and is thereby contained by the band of material 26, 126. The sleeve 18 protects the housing from plastic deformation that could result from the expansive forces. The radial force has a contraction affect on the shaft 12 and is thereby contained by the material 26. If the shaft is thereafter rotated in the other direction, the rollers 22 run down the inclined recesses defined by the race 20a toward the second ends and are freed in the space between the race 20a and surface 12b, and no torque is transmitted and the housing 14, 114 can rotate freely about the shaft 12. Thus, a rider on a bicycle having a free-wheel utilizing the present invention, may move in a forward direction by pedaling the bicycle so that torque is transmitted to the free-wheel (i.e., the shaft 12 is drivingly engaged with the housing 14, 114) or, once the bicycle has gained momentum, he may refrain from pedaling or pedal in a reverse direction without affecting the forward movement of the bicycle.

The embodiments of the present invention as described herein have many advantages over the prior art, including low weight. The use of fiber composite material not only restrains the high forces generated by the roller clutch, but, for a given load, also permits the roller clutch assembly, in addition to being much lighter than previous roller clutch assemblies, to be lighter than a ratchet clutch assembly.

A further advantage achieved over ratchet clutches is that the present invention operates silently and engages instantly when torque is applied.

A further advantage results from the added strength that accrues from the special materials used. The tubular shaft 12 can be designed to receive a relatively large, strong, stiff axle. Greater cantilever loads than are possible with conventional designs could thereby be absorbed from components, such as gear assemblies and a bicycle frame, attached to the axle. This would be particularly advantageous for bicycles designed to be ridden over race circuits or rough terrain.

In addition to the advantages described above, the alternative embodiment can be constructed using less material and thus be lighter than the first preferred embodiment. This capability derives from the positioning the reinforcing material 126 closer to the source of the forces, i.e., the clutch rollers 22, thereby avoiding the dissipation of the forces by the housing 14, 114.

Figure 5:
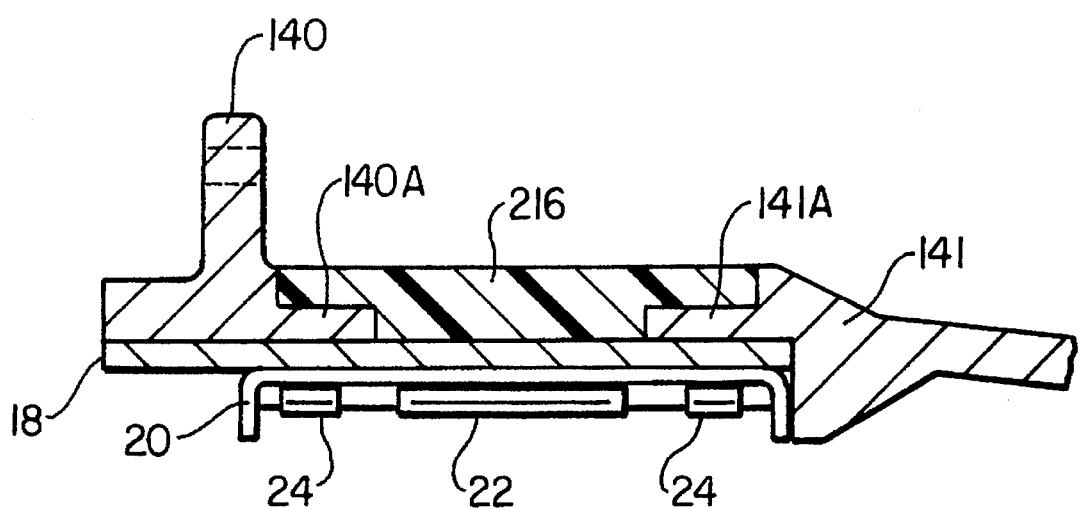
FIG. 5 is a partial cross-sectional view of an alternative embodiment of the housing of the present invention.

Although the present invention has been described in considerable detail with reference to two preferred embodiments thereof, other embodiments are possible. For example, the housing member may be formed in two portions 140, 141 (see FIG. 5) having corresponding, spaced apart shoulders 140A, 141A so that reinforcing material 216 may be interspersed therebetween, thus circumscribing both the housing shoulders 140A, 141A and the sleeve 18 to contain forces generated by clutch rollers 22. The roller clutch assembly is not limited in application to bicycles, but rather may have many other applications, including use with wheeled vehicles, transmissions, and sailing vessels. A sprag clutch may be used in place of a roller clutch. High-strength, high-modulus materials other than carbon fiber, such as metal matrix or other exotic materials, may be used. Rather than affixing high-strength, high-modulus materials to the housing 14, 114 and shaft 12, the entire housing and shaft may be constructed from such materials. Elements of the invention, such as the sleeve 18, may be constructed from materials other than steel, such as ceramic. The housing 14, 114 may also be constructed from other materials, such as boron fiber impregnated aluminum. The clutch rollers 22 may be spring-loaded to obviate backlash. The number of sets of roller bearings 24 or clutch rollers 22 may vary. Therefore, the spirit and scope of the appended claims should not be limited to the description of the preferred embodiment contained herein.

What is claimed is:

1. An overrunning clutch comprising:

a tubular shaft member having an inner surface;

a housing member rotatably sleeved about said shaft member, said housing member having an outer surface;

means for establishing torque communication between said housing member and said shaft member only when relative rotation between said housing member and said shaft member is in a first direction;

a first reinforcing material circumscribing said outer surface of said housing member for containing expansive forces applied to said housing member during said torque communication; and a second reinforcing material urged against said inner surface of said shaft member for resisting compressive forces applied to said shaft member during said torque communication, said reinforcing materials having high tensile strength and a high modulus of elasticity.

2. The overrunning clutch of claim 1, wherein said torque establishing means comprises a plurality of rollers; and said housing member and said shaft member define therebetween an annular space and at least one annular race having inclined recesses for receiving said rollers for the transmission of torque between said housing member and said shaft member when relative rotation between said housing member and said shaft member is in a first direction, but not in a second and opposite direction.

3. The overrunning clutch of claim 2, wherein said recesses have a first end and a second end, said first end being smaller than the diameter of said rollers, said second end being larger than the diameter of said rollers, said rollers moving up and into said first end thereby jamming between said housing member and said shaft member for torque communication when rotation is in a first direction, said rollers moving down and into said second end when rotation is in a second direction.

4. The overrunning clutch of claim 1, wherein said first reinforcing material comprises fiber materials having high tensile strength and a high modulus of elasticity.

5. The overrunning clutch of claim 1, wherein said first and second reinforcing materials are carbon-fiber composite materials.

6. The overrunning clutch of claim 1, wherein said first reinforcing material is wrapped around said outer surface of said housing member while said first material is in tension.

7. The overrunning clutch of claim 1, wherein said second reinforcing material is a cured, pre-fabricated, tubular section of fiber material press-fitted into said shaft member.

8. The overrunning clutch of claim 1, wherein said first and second materials are fiber-reinforced metal.

9. The overrunning clutch of claim 1, wherein said first and second materials are ceramic.

10. A bicycle free-wheel hub assembly comprising:

a steel tubular shaft having an inner surface;

an aluminum housing rotatably sleeved about said shaft, said housing having an outer surface;

rollers;

a shell disposed between said shaft and said housing, said shell defining at least one annular race having inclined recesses for housing said rollers, said housing being freely rotatable about said shaft in a first direction, but engaging said shaft and establishing torque communication therebetween in a second and opposite direction;

a hardened steel sleeve disposed between said housing and said shell for protecting said housing from plastic deformation;

a first reinforcing material integrally bonded to said outer surface for reinforcing said housing to contain expansive forces applied to said housing during said torque communication; and a second reinforcing material integrally bonded to said inner surface for reinforcing said shaft to contain compressive forces applied to said shaft during said torque communication.

11. The bicycle free-wheel hub assembly of claim 10, wherein said first reinforcing material comprises carbon fiber having high tensile strength and a high modulus of elasticity and said second reinforcing material comprises carbon fiber having high compressive strength and a high modulus of elasticity.

12. The bicycle free-wheel hub assembly of claim 10, wherein said recesses have a first end and a second end, said first end being smaller than the diameter of said rollers, said second end being larger than the diameter of said rollers, said rollers moving up and into said first end thereby jamming between said housing member and said shaft member for torque communication when rotation is in a first direction, said rollers moving down and into said second end when rotation is in a second direction.

13. An overrunning clutch assembly comprising:

a steel tubular shaft having an inner surface;

an aluminum housing rotatably sleeved about said shaft; rollers;

a shell disposed between said shaft and said housing, said shell defining at least one annular race having inclined recesses for housing said rollers, said housing being freely rotatable about said shaft in a first direction, but engaging said shaft and establishing torque communication therebetween in a second and opposite direction;

a hardened steel sleeve disposed between said housing and said shell, said shell having an outer surface;

a first reinforcing material affixed to said outer surface for reinforcing said sleeve to contain expansive forces applied to said sleeve during said torque communication; and a second reinforcing material affixed to said inner surface for reinforcing said shaft to contain compressive forces applied to said shaft during said torque communication.

14. The assembly of claim 13, wherein said first reinforcing material comprises carbon fiber having high tensile strength and a high modulus of elasticity and said second reinforcing material comprises carbon fiber having high compressive strength and a high modulus of elasticity.

15. The assembly of claim 13, wherein said recesses have a first end and a second end, said first end being smaller than the diameter of said rollers, said second end being larger than the diameter of said rollers, said rollers moving up and into said first end thereby jamming between said housing member and said shaft member for torque communication when rotation is in a first direction, said rollers moving down and into said second end when rotation is in a second direction.

* * * * *